Patented Oct. 7, 1930

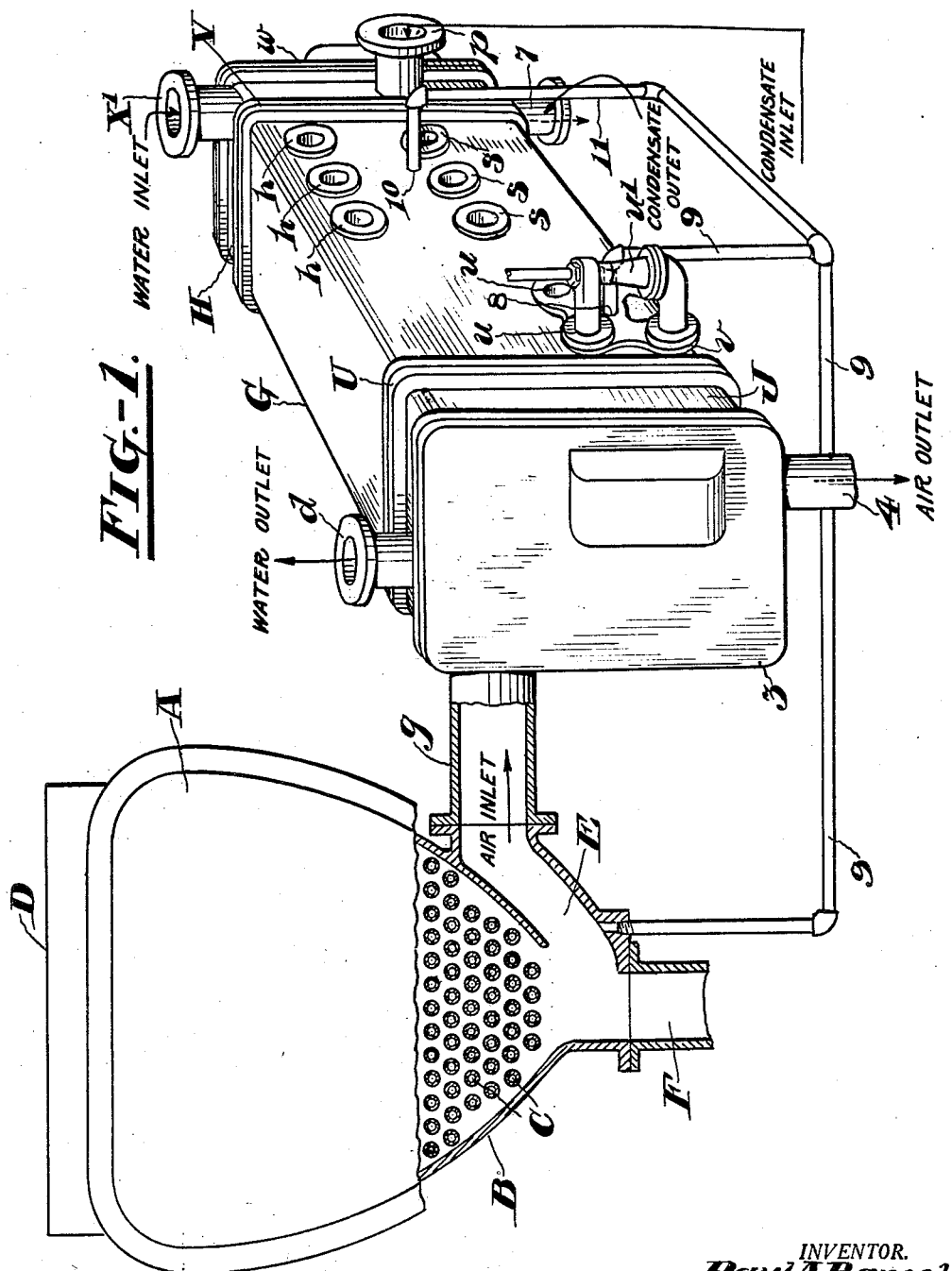

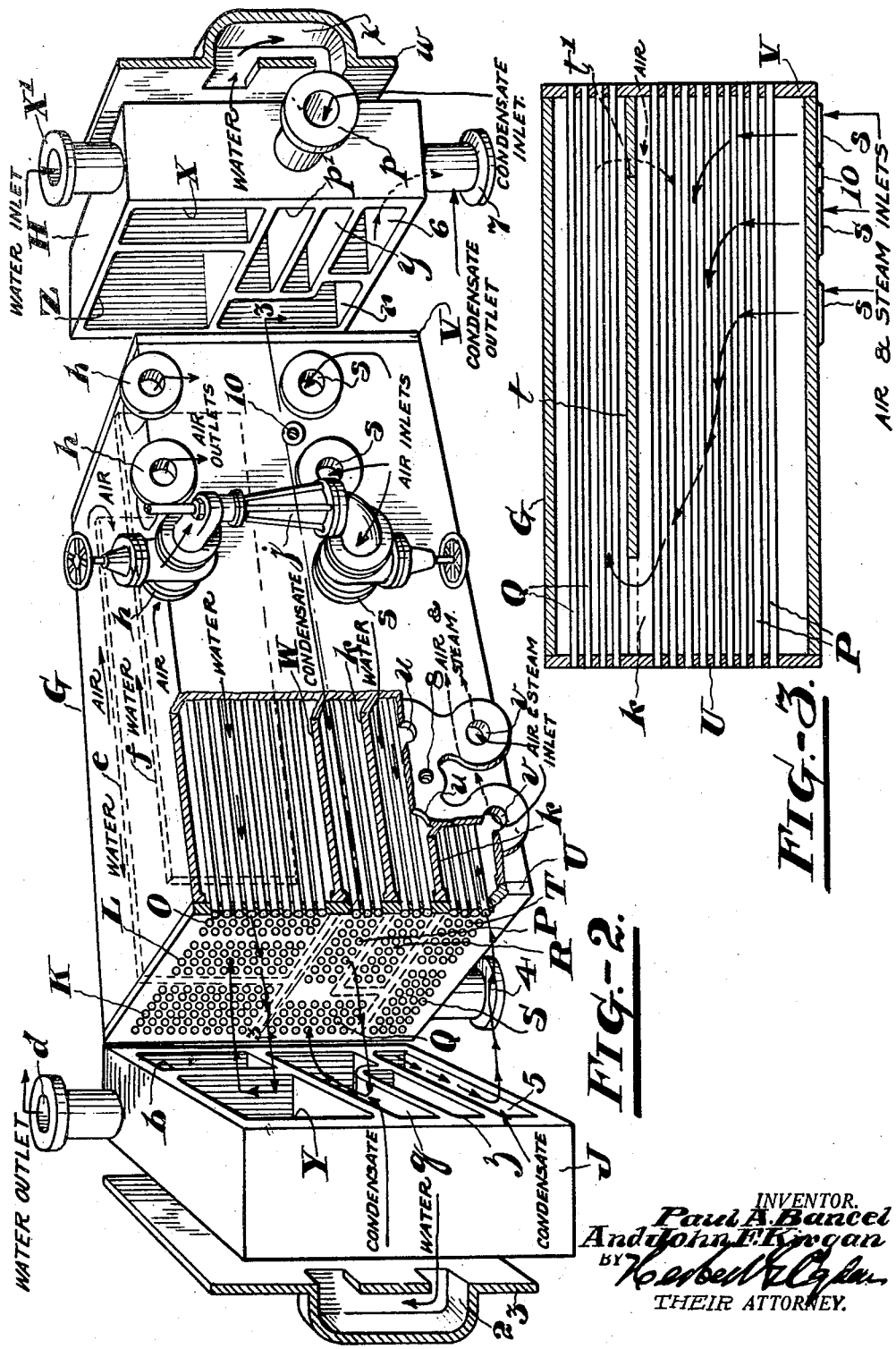

1,777,280

UNITED STATES PATENT OFFICE

PAUL A. BANCEL, OF NUTLEY, NEW JERSEY, AND JOHN F. KIRGAN, OF EASTON, PENN-SYLVANIA, ASSIGNORS TO INGERSOLL-RAND COMPANY, OF JERSEY CITY, NEW JERSEY, A CORPORATION OF NEW JERSEY

STEAM-CONDENSING APPARATUS

Application filed March 4, 1927. Serial No. 172,674.

This invention relates to steam condensing apparatus and more particularly to surface condensers.

In a plant employing steam condensers, efficiency is the main consideration. Steam condensers are used to provide the least possible back pressure at the steam consuming apparatus, thereby making available a greater quantity of heat produced by the fuel. Surface condensers are especially adapted for use where the water available for boiler feed is limited making it desirable to reuse the condensate for boiler water. The problem in such condensers is to save and return as much heat as possible to the boilers.

The greatest factor interfering with efficient working of a condenser is the presence of air and uncondensible gas in the condenser. Without such air a condenser would produce a nearly perfect vacuum, all parts of the condenser would operate efficiently and condensate would be delivered at a temperature corresponding to the pressure within the condenser and the temperature of the cooling water.

To properly increase the working efficiency of the condenser, therefore, the leakage air and uncondensible gases must be removed from the main steam condensing part of the condenser with the least expenditure of power and heat which that power represents, and that is the main object of this invention.

In the practice of this invention, the air is shrunk or reduced to its least practicable volume by removing the condensible vapor and lowering its temperature. This operation permits the use of evacuating apparatus of relatively small capacity which is one step in heat economy since the evacuating apparatus, directly or indirectly consumes heat.

The operation of condensing may be resolved into two closely related processes, to condense the major part of the steam at practically constant temperature and to devaporize and cool the air to be removed from the system. In the first, the ratio of air to steam is relatively small and because of the great amount of heat in the steam, the absorption of heat by cooling surface is relatively simple. Apparatus for performing this function efficiently is, however, not so well adapted under the same conditions to devaporize air and uncondensible gas efficiently. A waste of energy is produced by forcing water through tubes at high velocity such as is necessary to carry off heat absorbed in condensing steam, whereas low water velocity will suffice to carry off heat absorbed in devaporizing the air. If the two processes take place together, they interfere and the cooling surface will absorb heat from the condensate causing a waste of heat that must be resupplied before the condensate is returned to the boiler.

By the system of this invention the steam condensation is carried on in a chamber or main condenser having high steam condensing capacity and high water velocity to carry off the absorbed heat and the air and uncondensible gases are carried off not to a separate cooler and devaporizer having relatively low vapor condensing capacity and relatively low condensing water velocity which is the economical condition for devaporization.

Drawing the air hot from the main condenser presupposes that hot steam penetrates the main condenser cooling tube bank in every part for if steam penetrates only the warmer parts of the tube bank, the cooled air reduces the temperature of the warmer parts to an extent that the condensate will also be wastefully cooled. The ideal condition would be obtained when steam penetrates throughout the main condenser only to the last row of cooling tubes. Apparatus for providing such a condition of steam penetration, practically, is found in United States patent to P. A. Bancel No. 1,550,332 granted August 18, 1925 for Surface condenser.

This invention contemplates also the use of steam jet evacuating apparatus and the recovery of the heat used thereby to re-heat the condensate.

Other objects and advantages will be in part obvious and in part pointed out hereinafter.

In the drawings in which similar reference characters refer to similar parts,

Figure 1 is a view in elevation of a steam condensing system constructed in accordance with the practice of the invention, a portion of the condenser being shown in section to show the condensate and air outlets, and the devaporizer, cooler, inter-condenser, and after-condenser units being shown in perspective, Figure 2 is a perspective view of the devaporizer, cooler, inter-condenser and after-condenser units with the water boxes and cover plates adjacent their operating positions and parts broken away to show the internal arrangement, and Figure 3 is a horizontal section through the inter-condenser to show the arrangement of partitions.

Referring to the drawings and more particularly to Figure 1, a main condenser A is provided having a shell B enclosing cooling water tubes C preferably arranged transverse to the path of the steam to be condensed and receiving water from a suitable source (not shown) and delivering the water to an outlet (not shown). The steam to be condensed is adapted to enter the shell B at an inlet D, in this instance and, passing by and around the tubes C, to travel toward the region of greatest vacuum adjacent the air outlet E. The condensate is withdrawn through a suitable condensate outlet F.

The arrangement of parts in the main condenser A is such that all cooling surface provided by the tubes C is actively engaged in condensing steam, which is to say that condensation is accompanied by no material change in temperature. The cooling tubes C absorb merely the heat of vaporization leaving the condensate and air and residual vapors at a temperature substantially corresponding to the pressure existing within the shell B. For this purpose the water velocity in the tubes C is relatively high throughout as compared with the conventional condenser in which certain zones are provided for air cooling and devaporizing. This condenser system is distinguishable from prior condensers in that substantially all air devaporizing is completely segregated.

The reason for maintaining a relatively high temperature is that if the condensate is cooled, its heat must have been absorbed by the water in the tubes C. Such heat being lost represents a loss in efficiency for the condensate must be reheated for boiler feed, and also cooling water has been forced through the tubes C at an expenditure of power to do no useful work.

However, it is not desirable that a relatively large quantity of live steam should be withdrawn from the outlet E since in that case the apparatus for withdrawing the residual air must be of large capacity. To this end it is preferable that the main condenser A be constructed as set forth in United States patent to P. A. Bancel No. 1,550,332 granted August 18, 1925 for Surface condenser wherein is illustrated a construction adapted to distribute the steam to all portions of the condenser in quantities proportionate to their specific steam condensing capacity.

Since the degree of vacuum obtainable in the main condenser A depends entirely upon the rate at which the air and vapors uncondensible in the main condenser, can be removed, it is desirable to treat such air and vapor to shrink them to their least practicable volume in order that the removal apparatus may be of small capacity and therefore require the least power.

The apparatus for devaporizing and cooling the air withdrawn from the main condenser A comprises a unitary structure of cooling devaporizer and inter-condenser, and after-condenser for recovering heat expended, housed in a single shell G having water boxes H and J for directing the flow of cooling water through tube groups K, L, O, P, Q, R, S and T sealed in tube sheets U and V at the ends of the shell G.

The cooler and devaporizer includes the tube groups K, L and O and is separated from the inter-condenser by a horizontal partition W. There is relatively little heat to be absorbed from the air and vapor to lower the temperature to that of the cooling water. Therefore, the tube groups K, L and O are connected in series to form three passes for the cooling water before leaving this cooler and devaporizer. To this end the water box H is provided with a water inlet X' entering a chamber X leading to the tube group O. The tube group O empties into a chamber Y in the box J returning the water to tube group L whence the water passes to chamber Z in the box H and is returned through tube group K to chamber b in water box J and thence discharged through the outlet d. Due to the length of the path of the water passing successively through the tube groups O, L and K and the smaller size of tubes employed, the velocity of the cooling water is low as compared with the water velocity through tubes C of the main condenser section A. Low water velocity in the devaporizer is important since this effects a saving in power utilized in pumping.

In order to maintain the air and vapor in contact with the tube cooling surface as long as possible while maintaining the air velocity, the air passage is also made multiple pass. In this instance three passes for the air are provided formed by longitudinal partitions e and f between the tube groups K and L, and L and O respectively. The partition e abuts the tube sheet U but does not reach to the tube sheet V; likewise, the partition f abuts the tube sheet V but does not reach the tube sheet U. The air and vapor entering the devaporizer and cooler therefore passes at relatively high velocity, accompanied by corresponding turbulence, along the tube groups K, L and O in succession and is ejected at outlets h by suitable ejecting apparatus as for instance the steam jets j (only one being shown for clearness).

The contrasting conditions in the main steam condensing section A and the devaporizer are important to be noted in carrying out their respective processes by this invention. In the steam condenser the amount of heat to be absorbed is great and the problem is to present the cooling water in such a manner that the water can quickly absorb the heat and be quickly removed. In the devaporizer, the problem is very different, there being relatively little heat to be absorbed and the necessity of removing the air quickly to maintain low vacuum. It is evident that the problems require different apparatus for their solution and that the steam condenser is not properly suited for both processes.

By the arrangement of air passes and water passes the water and air are caused to flow in opposite directions; thus the air is gradually devaporized and is ejected from the outlets h at approximately the cooling water temperature and therefore at its minimum volume. The ejector jets j are consequently of minimum capacity and utilize the least steam.

The steam jets j compress the devaporized air part way up to atmospheric pressure and discharge into an inter-condenser housed in the shell G between horizontal walls W and k and comprising the tube groups P, Q and R. In this inter-condenser, the temperature of the mixture of air and steam from the jets j is high and the heat is used to raise the temperature of the condensate from the main condenser A. The object of the inter-condenser is, therefore, primarily to recover the heat used at the steam jets j. To this end condensate is admitted into the water box H by means of an inlet p and passed from a chamber p' through the tube group P to a return chamber q in the water box J. The condensate returns from the chamber q through the tube group Q to a chamber r in water box H. The air passage in the inter-condenser is three pass entering from the steam jets j at inlets s and passing the length of the tube group P and then around the end of a vertical partition t to the tube group Q whence it passes to the right around another vertical partition t' which is preferably immediately below partition t, to the tube group R and the outlets u.

The last tube group R is cooled by raw cooling water to reduce the air to its least volume preparatory to ejection by suitable evacuating apparatus, such as secondary steam jets u' into the after-condenser through the inlets v. To this end the cover plate w of the water box H is provided with a by-pass x to permit raw cooling water to pass from the chamber X to a lower chamber y adjoining the tube group R. Water from the tube group R is discharged into a chamber z in water box J connected with chamber Y by a by-pass 2 formed in the cover plate 3 of water box J.

The after-condenser consists of that portion of the shell G between the horizontal partition k and the bottom wall and includes the tube groups S and T, and is adapted to recover the heat from the steam used in ejecting the air from the inter-condenser. The pressure existing in the after-condenser is slightly above atmospheric pressure due to the slight resistance of the air encountered in its passage to the outlet 4. The temperature of the air and steam mixture entering the inlet v is accordingly high, and provides a means for heating the condensate. To this end the condensate after passing through the inter-condenser enters the after-condenser at the tube group S from the chamber r and discharges in the return chamber 5 in the opposite water box J. From the chamber 5 the condensate passes through tube group T to the condensate discharge chamber 6 in water box H and through an outlet 7 to any suitable apparatus (not shown) for returning the condensate to the boiler (not shown).

The air entering the inlets v is adapted to contact first with the tube group T and lastly with the tube group S, and thence to the outlet 4.

The gradual compression or increase of air pressure from a minimum at steam jets j to atmospheric at the outlet 4 by two stages, permits the recovery of condensate from the first stage or inter-condenser. Such condensate is removed from the inter-condenser at an outlet 8 through a trap consisting of a U-system of pipes 9.

Likewise, the condensate from the devaporizer and cooler is preferably withdrawn through an outlet 10 connected with a pipe 11 tapping into the pipe 9.

During normal operations, condensate stands in the legs of the pipes 9 and 11 at levels corresponding to the pressure difference in the inter-condenser and devaporizer. Preferably, the pipe 9 leads to a portion of the main condenser shell B adjacent the condensate outlet F.

We claim:

1. Condensing apparatus comprising a main condenser having means for assuring large steam condensing capacity and high condensing water velocity, a cooler and devaporizer connected to receive hot air and uncondensible gases issuing from said main condenser and being connected on the water side to receive condensing water from the same supply as the main condenser, and means in said cooler and devaporizer adapted to produce relatively low condensing water velocity and relatively low vapor condensing capacity in said cooler as compared with said main condenser.

2. Condensing apparatus comprising a main condenser of the tubular type having relatively large cooling water conveying tubes to assure large steam condensing capacity and high condensing water velocity, a cooler and devaporizer separate from the main condenser, a connection for conveying hot air and uncondensible gases from the main condenser to the cooler, and water tubes arranged in multiple passes in the cooler and being of smaller area than the tubes of the main condenser to lower the water velocity in said cooler as compared with the water velocity in said main condenser.

3. Condensing apparatus comprising a main condenser of the tubular type having only an active zone of large steam condensing capacity and high condensing water velocity, a multiple pass pre-cooler for the air and uncondensible gases from the main condenser having water tubes arranged in multiple passes to provide relatively low condensing water velocity, and inter-condenser, connection means separate from the water circulation system of said pre-cooler for circulating condensate in said inter-condenser for devaporizing the air and condensible gases from the pre-cooler, and steam jets for ejecting the air and uncondensible gases from the pre-cooler into the inter-condenser.

4. Condensing apparatus comprising a main condenser of the tubular type having large steam condensing capacity and high condensing water velocity, an auxiliary condenser having a pre-cooler section to shrink the volume of air and uncondensible gases removed from the main condenser, said pre-cooler having circulating water connection means for raw water supply, steam jets to eject such air and uncondensible gases from the pre-cooler section, and a second condenser section to condense and re-absorb the heat from the steam utilized by the steam jets, said second condenser section having separate circulating water connection means adapted to employ condensate from the main condenser section to condense such steam.

5. Condensing apparatus comprising a main condenser of the tubular type having large steam condensing capacity and high condensing water velocity, an auxiliary condenser having a pre-cooler section for shrinking the volume of air and uncondensible gases removed from the main condenser and directly connected to said main condenser without the interposition of evacuating apparatus, steam jets to eject such air and uncondensible gases from the pre-cooler section, a second condenser section to condense and re-absorb the heat from the steam utilized by the steam jets, said second condenser section including multiple pass gas chambers and cooling tubes, means to deliver condensate from the main condenser to the tubes in the first pass chamber, connection means to deliver raw water to the tubes in the last pass chamber of said second section, and means to remove the air and uncondensible gases from the second section.

6. Condenser apparatus comprising a main condenser having large steam condensing capacity, an auxiliary condenser having a pre-cooler section to shrink the volume of air and uncondensible gases removed from the main condenser section directly connected to the main condenser section without the interposition of evacuating apparatus, steam jets to eject such air and uncondensible gases from said pre-cooler section, successive condenser sections of progressively increasing absolute pressure and temperature having connection means adapted to be associated with a condensate supply from the main condenser employing condensate for absorbing the heat of the steam from said jets, and separate means for receiving raw water in a portion of said sections for shrinking the volume of air and uncondensible gas to be ejected.

7. Condensing apparatus comprising a main condenser section having a large steam condensing capacity and employing raw cooling water at high velocity, a pre-cooler section directly connected to the main section without the interposition of vacuum intensifiers therebetween to shrink the volume of the air and uncondensible gases removed from said main section and employing raw cooling water in multiple tube passes, steam jets for ejecting such air and uncondensible gases from the pre-cooler, an intercondenser section to receive said air and gases and having condensate tube passes to absorb heat therefrom and having separate raw water tube passes to shrink the volume of air and uncondensible gases remaining, an after-condenser section at substantially atmospheric pressure to receive such remaining air and uncondensible gases and having condensate passes to absorb heat therefrom, and steam jets for ejecting said remaining air and gas from said inter-condenser section to said after-condenser.

8. Condensing apparatus comprising a main condenser section having large steam condensing capacity and a single raw cooling water pass to provide high circulating water velocity, and means to remove air and uncondensible gases from said main section at a temperature approximately corresponding to the condensation temperature of steam at the pressure within said main section, including a pre-cooler section having multiple raw cooling water passes to provide relatively low velocity for shrinking the volume of such air and gases, steam jets for ejecting such air and gases from said pre-cooler section, and a plurality of steam jet operated condenser sections successively arranged and having multiple condensate passes to recover the heat of the steam jets and a raw cooling water pass to shrink the volume of the remaining air and uncondensible gases.

9. Condensing apparatus comprising a main condenser of relatively large size having large steam condensing capacity and single pass circulating water flow to provide high condensing water velocity, and a pre-cooler and a devaporizer for the hot air and uncondensible gases from the main condenser the cooler and devaporizer each having multiple passes for the flow of such air and gases, and multiple tube passes for the cooling water.

10. Condensing apparatus comprising a main condenser of relatively large size having large steam condensing capacity and single pass water flow to provide high condensing water velocity, and a pre-cooler and a devaporizer for the hot air and uncondensible gases from the main condenser each having multiple passes for the flow of such air and gases, and each having multiple tube passes for the cooling water counter to the direction of air flow.

11. Condensing apparatus comprising a main condenser having large steam condensing capacity and single pass circulating water flow to provide high condensing water velocity, a cooler for the hot air and uncondensible gases from the main condenser having multiple passes for the flow of such air and gases and multiple tube passes for the cooling water, steam jets for evacuating said devaporizer, and an inter-condenser cooled by condensate from the main condenser and having multiple tube passes therefor to recover the heat from the steam utilized by said steam jets.

12. Condensing apparatus comprising a main condenser of relatively large size having large steam condensing capacity and single pass circulating water flow to provide high condensing water velocity, a cooler and devaporizer for the hot air and uncondensible gases from the main condenser having multiple passes for the flow of such air and gases and counter flow multiple tube passes for the cooling water, steam jets for evacuating said devaporizer, and an inter-condenser having multiple tube passes for condensate from the main condenser to recover the heat from the steam utilized by said steam jets, said devaporizer and inter-condenser being housed in the same shell.

13. Condensing apparatus comprising a main condenser of relatively large size having large steam condensing capacity and single pass circulating waterflow to provide high condensing water velocity, a cooler and devaporizer for the hot air and uncondensible gases from the main condenser directly connected thereto without the interposition of vacuum intensifiers having multiple passes for the flow of such air and gases, and counter directional multiple tube passes for the cooling water, an inter-condenser and an after-condenser cooled by condensate from the main condenser, and steam jets between the devaporizer and inter-condenser and between the inter-condenser and after-condenser to compress the air from a minimum pressure at the devaporizer to atmospheric pressure at the after-condenser, said inter-condenser and after-condenser being adapted to recover the heat expended by said steam jets.

14. Condensing apparatus comprising a main condenser of relatively large size having large steam condensing capacity and single pass circulating waterflow to provide high condensing water velocity, a cooler and devaporizer for the hot air and uncondensible gases from the main condenser having multiple passes for the flow of such air and gases and counter directional multiple passes for the raw cooling water, an inter-condenser having multiple air passes counter directional, multiple water tube passes cooled by condensate and a separate final water pass cooled by raw cooling water, steam jets for evacuating the devaporizer, and steam jets for evacuating the inter-condenser.

15. Condensing apparatus comprising a main condenser of relatively large size having large steam condensing capacity and single pass circulating water flow to provide high condensing water velocity, a cooler and devaporizer for the hot air and uncondensible gases from the main condenser having multiple passes for the flow of such air and gasses and multiple tube passes for raw cooling water, an inter-condenser having multiple air passes counter directional, multiple water tube passes cooled by condensate and a final water pass cooled by raw cooling water, steam jets for evacuating the devaporizer, steam jets for evacuating the inter-condenser, and an after-condenser cooled by condensate to recover the heat expended by certain of the steam jets.

16. An auxiliary steam condensing apparatus including a casing and tubes in the casing, comprising a pre-condenser section having tubes to receive raw cooling water in the water side of the condenser, a second condenser section to shrink the volume of air and uncondensable gases removed from the main section and having tubes to receive raw cooling water on the water side of the condenser, and means in the casing for directing the flow of the uncondensable gases lengthwise of the tubes, said sections being housed within the casing.

17. An auxiliary steam condensing apparatus including a casing and tubes in the casing, comprising a pre-condenser section having tubes to receive raw cooling water on the water side of the condenser, a second condenser section to shrink the volume of air and uncondensable gases issuing from said main section, means for removing the air and uncondensable gases from the main section and transferring them to said second section, said second section having tubes employing raw cooling water in the water side of the condenser, and means in the casing for directing the flow of air and uncondensable gases lengthwise of the tubes, said sections being housed within the casing.

18. An auxiliary steam condensing apparatus including a casing and tubes in the casing, comprising a pre-condenser having tubes employing raw cooling water on the water side of the condenser, and a second condenser section to shrink the volume of air and uncondensable gases removed from said main section and having groups of tubes employing raw cooling water and condensate separately in the water side of the condenser, and means for directing the flow of the air and uncondensable gases lengthwise of the tubes, said sections being housed within the casing.

19. An auxiliary steam condensing apparatus including a casing and tubes in the casing, comprising a pre-condenser section having multiple tube passes employing raw cooling water on the water side of the condenser, a second condenser section to shrink the volume of air and uncondensible gases removed from the main section and also having multiple tube passes employing condensate and a pass employing raw cooling water, and baffles in the casing to direct the air and uncondensible gases lengthwise of the tubes, the said sections being housed within the casing.

20. An auxiliary steam condensing apparatus including a casing having tubes therein, comprising a pre-condenser section having multiple tube passes employing raw cooling water on the water side of the condenser, a second condenser section having multiple tube passes employing raw cooling water on the water side of the condenser and also employing condensate on the water side of the condenser, and means in the casing for directing air and uncondensible gases lengthwise of the tubes, the said sections being housed within the casing.

21. An auxiliary steam condensing apparatus including a casing and tubes in the casing, comprising a pre-condenser section having multiple tube passes employing raw cooling water on the water side of the condenser, a second condenser section also having multiple tube passes employing raw water on the water side of the condenser and in addition employing condensate on the water side of the condenser, steam jets for ejecting air and uncondensible gases from the first condenser section to the second condenser section, and baffles in the casing for directing the air and uncondensible gases lengthwise of the tubes, the said sections being housed within the casing.

22. An auxiliary steam condensing apparatus including a casing having tubes therein, comprising a pre-cooler condensing section having multiple tube passes employing raw cooling water on the water side of the condenser and an inter-condenser section having multiple tube passes employing raw cooling water on the water side of the condenser and also employing condensate on the water side of the condenser, and an after-condenser having multiple tube passes employing condensate on the water side of the condenser, and baffles in the casing for directing the flow of the air and uncondensible gases lengthwise of the tubes, all of said condensing sections being housed within the casing.

In testimony whereof we have signed this specification.

PAUL A. BANCEL.
JOHN F. KIRGAN.